Sept. 24, 1968  N. K. G. AHLBORG  3,402,992
METHOD FOR RECOVERING CHEMICALS FROM WASTE LIQUOR
OBTAINED DURING THE PRODUCTION OF CELLULOSE
Filed Feb. 1, 1965
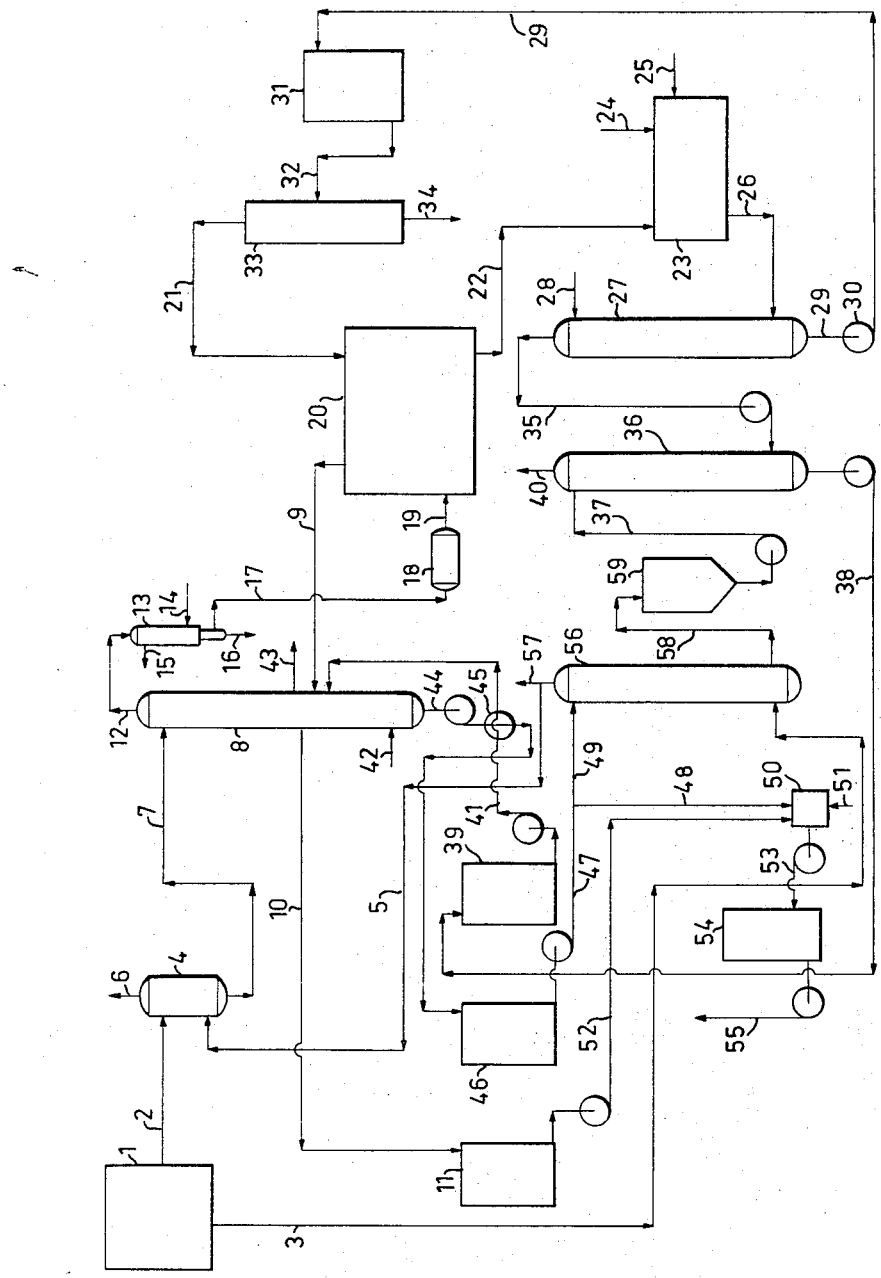
INVENTOR.
Nils Knut Gabriel Ahlborg
BY
Cushman, Darby & Cushman
Attorneys United States Patent Office 3,402,992
Patented Sept. 24, 1968

3,402,992
METHOD FOR RECOVERING CHEMICALS FROM WASTE LIQUOR OBTAINED DURING THE PRODUCTION OF CELLULOSE
Nils Knut Gabriel Ahlborg, Falun, Sweden, assignor to Stora Kopparbergs Bergslags Aktiebolag, a corporation of Sweden
Filed Feb. 1, 1965, Ser. No. 430,790
Claims priority, application Sweden, Feb. 7, 1964, 1,504/64
4 Claims. (Cl. 23—48)

The present invention relates to a method for recovering chemicals from waste liquors obtained by cooking cellulose containing fibre materials in one stage with a cooking liquor containing alkali metal sulphite or alkali metal sulphite and bisulphite and also alkali metal bicarbonate and/or alkali metal carbonate.

If such alkali metals containing waste liquor is evaporated, for example to a dry content of 45–60%, and burnt in a soda house aggregate, a smelt is obtained which in the following is called smelt-soda and which consists substantially of alkali metal carbonate, alkali metal sulphide and smaller quantities of alkali metal sulphate, sulphite and thio-sulphate. Furthermore waste gases are obtained, which contain sulphur dioxide.

It is known to recover sulphide sulphur from solutions of smelt-soda in one process in which an excess of carbon dioxide is caused to react with the solution, forming a gaseous mixture which contains the excess of carbon dioxide and hydrogen sulphide, whereby a solution is simultantously obtained which is mainly free from sulphide sulphur. It is also known to allow this solution to react with sulphur dioxide, whereby carbon dioxide is released and a solution of alkali metal sulphite is obtained which can be used directly, or upon subsequent treatment, for producing further quantities of pulp from wood. Furthermore it is known to allow the hydrogen sulphide which appears in the carbon dioxide gas to react with sulphur dioxide for forming elementary sulphur, and to burn the sulphur with air in order to produce the sulphur dioxide, which is used in the reaction with hydrogen sulphide and also in the reaction with the solution having been substantially released from sulphide sulphur by reacting with carbon dioxide.

It is furthermore known that if the reaction with the solution of smelt-soda is to proceed in a most favourable manner, said solution must be converted with substantially pure carbon dioxide since undesired reactions occur if the carbon dioxide is mixed with oxygen, and because the reaction proceeds slowly and therefore requires large equipment with large reaction zones, if the carbon dioxide is mixed with an appreciable volume of inert gas such as nitrogen. Furthermore the reaction between the hydrogen sulphide and the sulphur dioxide, for forming elementary sulphur, should take place in a gas-phase rather than with the sulphur dioxide in a water solution for facilitating the recovering of the sulphur.

The object of the invention is to produce a simple and economic process for recovering chemicals from the waste liquor obtained from a cooking of the type mentioned in the preamble, in which process the chemicals are recovered from a smelt soda solution partly in the form of alkali metal sulphite or alkali metal sulphite and bisulphite and partly in the form of alkali metal bicarbonate and/or alkali metal carbonate for the preparation of cooking liquor for producing, e.g. semichemical pulp where the cooking liquor is prepared by alkali metal sulphite or alkali metal sulphite and bisulphite in a mixture of alkali metal bicarbonate and/or carbonate which raises the buffer action of the cooking liquor.

This is achieved according to the invention, in that the waste liquor obtained from the cooking is evaporated and burnt, and also that alkali metal and sulphur are recovered from a water solution of the thereby obtained smelt soda, containing alkali metal sulphide and carbonate, causing the smelt soda solution to react with pure, or practically pure, carbon dioxide for driving off said sulphide sulphur in the form of hydrogen sulphide during the formation of sulphide free alkali metal bicarbonate-carbonate solution, which is decarbonized with an alkali metal bisulphite solution and/or $SO_2$ during the formation of an alkali metal sulphite and/or bisulphite solution and the release of carbon dioxide, which is used for said driving off sulphite sulphur, the hydrogen sulphide departing with the carbon dioxide is separated suitably by converting with pure, or practically pure, $SO_2$ in a contact furnace to elementary sulphur which is separated, the carbon dioxide, with or without free $SO_2$, which is released from the hydrogen sulphide, is returned and reused for driving off sulphide sulphur, before the decarbonization a portion of the sulphide free alkali metal bicarbonate-carbonate solution is led away for use in preparing cooking liquor for the cooking stage and the carbon dioxide loss in the recovery system, caused by this actiton is covered by the addition of $CO_2$ to the system. The carbon dioxide losses are thereby suitably covered due to $CO_2$ being absorbed in the smelt soda solution by pre-treatment of this with $SO_2$-poor $CO_2$-containing gases, in such restricted volumes that $H_2S$-repulsion is substantially avoided, whereby absorption of carbon dioxide can take place without thio-sulphate formations, even if the gases contain oxygen.

A preferred embodiment of the invention will be further described in the following with reference to a flow-sheet shown in the accompanying drawing.

In the following example, sodium is used as a base, all information concerning gases is calculated on a dry basis and by active soduim is meant titratable sodium.

The numeral 1 on the drawing indicates a conventional plant for producing a smelt soda solution, which is removed through a duct 2. The waste gases obtained during the lye-combustion-operation are removed through a duct 3.

The reference numeral 4 relates to a pre-carbonising chamber, which can be of the bubble-cap type. A water solution of the smelt soda is introduced into the chamber 4 through the duct 2 at a speed of 370 l./min. This solution has a temperature of approx. 70° C. and contains chemically bound active sodium in a quantity of 70 g./l. expressed as sodium oxide, so that the bound active sodium is passed through the duct 2 at a speed of 26.0 kg./min., expressed as sodium oxide. 35 g./l. of the bound, active sodium in the solution passing through the duct 2, expressed as sodium oxide, is in the form of sodium sulphide, so that the bound active sodium, in the form of sodium sulphide passes through the duct at a speed of 13.0 kg./min., expressed as sodium oxide. The residue of bound active sodium flowing through the duct 2 is mainly sodium carbonate having 9.2 kg./min. bound $CO_2$.

$SO_2$-poor $CO_2$-containing flue gas is supplied, through a duct 5 to the lower section of the pre-carbonising chamber 4, said flue gas being obtained by relieving the waste gases, removed through the duct 3, from $SO_2$, as will be described below. The flue gas in the pre-carbonizing chamber is caused to meet the incoming smelt soda solution through the duct 2, against the flow, for the formation of soda and sodium sulfhydrate whereby the flue gas is supplied in such restricted volumes that $H_2S$-repulsion is substantially avoided. The residual gas mixture is removed through a duct 6. The treated smelt soda solution is released from the bottom of the pre-carbonising chamber through a duct 7, said smelt soda solution now containing 19.5 kg./min. bound active sodium and 13.8 kg./min. $CO_2$ in the form of sodium carbonate and also 6.5 kg./min. bound active sodium in the form of sodium sulfhydrate, active sodium considered as sodium oxide, and is transferred to a reaction and repelling chamber, indicated by the reference numeral 8, of the bubble-cap type. A flow of carbon dioxide, containing a smaller amount of sulphur dioxide is fed into the chamber 8 by means of a duct 9.

This stream of carbon dioxide, together with carbon dioxide formed through the reaction between sodium bicarbonate-carbonate solution and sodium bisulphite solution in the lower section of the chamber 8 (as is evident in the following), rises and reacts in the upper section of the chamber with sodium sulfhydrate-carbonate solution during the release and repulsion of hydrogen sulphide, so that a sulphide free sodium bicarbonate-carbonate solution is present at the level of the duct 9, said solution being partly removed through the duct 10, with a speed more closely determined at 185 l./min. The removed solution contains 13 kg./min. bound active sodium, considered as sodium oxide and 12.9 kg./min. $CO_2$ in the form of sodium carbonate and/or bicarbonate and is led through the duct 10 to a storage vessel 11.

A gaseous mixture of carbon dioxide and hydrogen sulphide is led away from the upper section of the chamber 8 by means of a duct 12. This mixture has a temperature of approximately 75° C. and flows at a speed of 38 m.³/min., measured at 1 atmosphere at 0° C. The mixture flowing through the duct 12 is composed of approximately 88 percent by volume carbon dioxide and 12 percent by volume hydrogen sulphide. The mixture flowing through the duct 12 is led into a gas cooler 13, where it is brought into indirect heat exchange with cooling water which is led in through a duct 14 and removed through a duct 15. The temperature of the gas mixture of carbon dioxide and hydrogen sulphide is reduced in the gas cooler 13 to approximately 40° C. and condensed water present as a result of the cooling is removed through a duct 16. The gaseous mixture of carbon dioxide and hydrogen sulphide is led from the gas cooler 13 via a duct 17 to a compressor 18 and therefrom by means of a duct 19 into a plant known per se 20 for producing elementary sulphur by the reaction between hydrogen sulphide and sulphur dioxide in a gas phase. A flow of gaseous sulphur dioxide, having a speed of approximately 7.2 kg./min., is led into the plant 20 by means of a duct 21.

A gaseous flow consisting of carbon dioxide and smaller amounts of sulphur dioxide and water vapor, leaves the plant 20 by means of the duct 9. This flow has a temperature of approximately 130° C. and is composed of approximately 99.2 percent by volume of carbon dioxide, 0.6 percent of sulphur dioxide and 0.2 percent by volume hydrogen sulphide. This flow of gas is led into the chamber 8 at a point where it meets sulphide free sodium bicarbonate-carbonate solution. Molten sulphur is removed from the plant 20 at a speed of 9.9 kg./min. through a duct 22 and is led into a conventional sulphur combustion unit 23 into which is also led replacement sulphur through a duct 24. Air is supplied through a duct 25. The unit 23 is of a conventional type and includes means for cooling (not shown) the hot gases formed with the burning of the sulphur.

A gaseous flow streams through a duct 26 from the sulphur combustion unit 23, said flow containing approximately 17 percent by volume sulphur dioxide. The gases flowing through the duct 26 are led into an absorption chamber 27. The water having a temperature of approximately 12° C., is led into the absorption chamber 27 through a duct 28. The mixture of gas flowing through the duct 26, and the water are brought into direct contact with each other in the chamber 27, with the result that a portion of the sulphur dioxide in the gas flow, which passes through the duct 26, is dissolved in the water. The sulphur dioxide containing water is removed from the absorption chamber 27 through a duct 29 and is pumped, by means of a pump 30, to a supply vessel 31. The water solution of sulphur dioxide is transferred from the storage vessel 31 to a distillation column 33 through a duct 32. Substantially pure sulphur dioxide is removed from the upper portion of the distillation column 33 at a speed of 7.2 kg./min. through the duct 21. The water is removed through a duct 34.

A flow of gas containing sulphur dioxide is removed from the upper section of the absorption chamber 27 through a duct 35. This flow has a lower sulphur dioxide content than the flow of gas passing through the duct 26 owing to the absorption of sulphur dioxide which occurs in the chamber 27. The gaseous flow through the duct 35, which maintains 10.0 kg. sulphur dioxide per minute, is led into a reaction chamber 36, in which, a water solution of sodium sulphite and sodium bisulphite is also led by means of a duct 37. The solution flows through the duct 37 at a speed of 185 l./min. Sulphur dioxide reacts with sodium sulphite in the chamber 36 in order to form a water solution of sodium bisulphite which is removed from the bottom of the chamber through a duct 38 and is led into a storage tank 39 for sodium bisulphite solution. A flow of gas, mainly consisting of nitrogen, is drawn off from the upper section of the chamber 36 through a duct 40.

A flow of sodium bisulphite solution is removed from the storage tank 39 through a duct 41, said flow having a speed of 185 liter/min., and containing 70 g. sodium bisulphite per liter expressed as sodium oxide (235 g. sodium bisulphite per liter) is led into the chamber 8 via the duct 41. The sodium bisulphite solution entering from the duct 41 into the chamber 8 reacts with the remaining portion of substantially sulphide free sodium bicarbonate-carbonate solution, formed in the upper section of the chamber 8 whereby the carbon dioxide gas is released and a water solution of sodium sulphite is formed. Steam is led in at the bottom of the chamber 8 through the duct 42 in order to increase the reaction speed and the repulsion of the carbon dioxide. A portion of the formed carbon dioxide is removed from the chamber 8 through a duct 43 at a point where the carbon dioxide is free from the sulphur dioxide. This point lies somewhat about the level where the duct 9 opens into the chamber 8. The volume of carbon dioxide passing through the duct 43 is approximately 2 m.³/min. The remainder of the formed carbon dioxide gases passes upwards through the chamber 8 and is removed through the duct 12.

A water solution of sodium sulphite is removed from the bottom of the chamber 8 through the duct 44, said solution flowing at a speed of approximately 370 l./min. and contains approximately 70 g. sodium sulphite per liter, expressed as sodium oxide (142 g. sodium sulphite per liter). This solution passes through a heat exchanger 45 and is led into a storage vessel 46, for sodium sulphite solution. A water solution of sodium sulphite is removed from the vessel 46 at a speed of approximately 370 l./min. through a duct 47. The flow departing through the duct 47 is divided into two part-flows 48, 49. The flow 48 travels at a speed of approximately 185 l./min. and is led into a mixer 50 into which water is also led via a duct 51, in required amounts depending upon how the pulp producing process is to be operated. Furthermore the sulphide free sodium bicarbonate-carbonate solution is led from the storage tank 11 to the mixer 50 through a duct 52. The mixture of sodium sulphite and sodium bicarbonate-carbonate passes through a duct 53 to a storage tank 54 and from this further through a duct 55, for the use in the production of pulp.

The water solution of sodium sulphite passing through the duct 49 is led into a scrubber 56 into the lower portion of which a flow of waste gas is introduced via the duct 3, said waste gas having a temperature of approximately 130° C. and containing approximately 0.2 percent by volume sulphur dioxide. The flow of waste gas is washed in the scrubber 56 together with the introduced sodium sulphite solution for the purpose of recovering the sulphur content in the flow of waste gas, through reaction of sodium sulphite and sulphur dioxide, for the formation of sodium bisulphite. Gas is removed from the scrubber 56 and a portion thereof is led through the duct 5 into the precarbonizing chamber 4 while the residue is led away through a duct 57. The formed sodium sulphite-bisulphite solution is removed through a duct 58. The flow of sodium sulphite-bisulphite solution passing through the duct 58 is led into a storage tank 59 is then passed therefrom into the chamber 36 via the duct 37.

In the example described above final carbonizing and sulphiting is carried out in one chamber 8. It is, however, obvious to one skilled in the art that both these reactions could be carried out in different chambers, whereby means are arranged for transferring the solution undergoing treatment from the chamber in which the final carbonising is carried out to the chamber in which the sulphiting is carried out. It is furthermore perceived that smelt sodium solutions having a $Na_2O$-content which is higher than the content stated in the example, for example 100 to 110 g. $Na_2O$ per liter, could be treated according to the method.

What I claim is:

1. A method for recovering chemicals from waste liquor obtained by cooking cellulose containing fiber materials with a cooking liquor containing alkali metal salts of sulphurous acid and alkali metal salts of carbonic acid in one cooking stage which comprises the steps of (a) evaporating and burning the waste liquor from the cooking stage and dissolving the smelt soda thereby produced in water to form a smelt soda solution which contains alkali metal sulfide and alkali metal carbonate, (b) reacting said smelt soda solution with substantially pure carbon dioxide gas whereby a substantially sulfide free alkali metal bicarbonate-carbonate solution and a gas mixture of carbon dioxide and hydrogen sulfide are formed, (c) drawing off a portion of said solution for use in the preparation of a cooking liquor for the cooking stage, (d) decarbonizing the remaining portion of the said solution with a sulfiting agent of the group consisting of alkali metal bisulfite solution and $SO_2$ thereby forming a solution of alkali metal salts of sulphurous acid which is used in the preparation of cooking liquor for the cooking stage, and gaseous carbon dioxide which is used in step (b), (e) converting the hydrogen sulfide relieved with the carbon dioxide in step (b) by converting it in a contact furnace with substantially pure $SO_2$ to elementary sulphur which is separated and using the carbon dioxide relieved from the hydrogen sulfide together with the carbon dioxide formed in step (d) in step (b), and (f) compensating the loss in carbon dioxide in the recovery system caused by drawing off said portion of the substantially sulphur free alkali metal bicarbonate-carbonate solution in step (c) by addition of $CO_2$ into the system.

2. The method as claimed in claim 1 wherein the smelt soda solution is precarbonated before step (b) by treatment with an $SO_2$-poor, $CO_2$-containing gas in such restricted volume that $H_2S$ repulsion is substantially avoided, whereby the loss of carbon dioxide in the recovery system caused by drawing off said portion of the substantially sulfide free alkali metal bicarbonate-carbonate solution in step (c) is compensated.

3. The method as claimed in claim 2 wherein the $SO_2$-poor, $CO_2$-containing gas is flue gas obtained from the burning of evaporated waste liquor in step (a), said flue gases having been scrubbed with a solution containing alkali metal sulfite.

4. The method as claimed in claim 3 wherein the alkali metal sulfite used to scrub said flue gas is the solution of alkali metal salts of sulphurous acid produced in step (d).

References Cited

UNITED STATES PATENTS

| | | | |
|---|---|---|---|
| 2,909,407 | 10/1959 | Ahlborg et al. | 23—129 |
| 3,026,240 | 3/1962 | Matty | 162—36 |
| 3,098,710 | 7/1963 | Ahlborg et al. | 23—129 |

OSCAR R. VERTIZ, *Primary Examiner.*

G. T. OZAKI, *Assistant Examiner.*